United States Patent [19]

Seegall et al.

[11] 3,920,816

[45] Nov. 18, 1975

[54] COMPOSITION FOR TREATING RESPIRATORY DISEASES

[75] Inventors: Manfred I. L. Seegall; Vera A. Seegall, both of San Diego, Calif.

[73] Assignee: Vis Mediatrix Naturae Scientific Laboratories, San Diego, Calif.

[22] Filed: Oct. 21, 1970

[21] Appl. No.: 82,811

Related U.S. Application Data

[63] Continuation-in-part of Ser. No. 694,394, Dec. 29, 1967, abandoned, which is a continuation-in-part of Ser. No. 510,396, Nov. 29, 1965, abandoned, which is a continuation-in-part of Ser. No. 690,450, Oct. 16, 1957, abandoned.

[52] U.S. Cl. ............................................... 424/195
[51] Int. Cl.² ......................................... A61K 35/78
[58] Field of Search ................... 424/176, 180, 195

[56] References Cited
UNITED STATES PATENTS
2,100,081   11/1937   Madaus ............................ 424/176

*Primary Examiner*—V. D. Turner

[57] ABSTRACT

Disclosed is a composition of matter consisting of the juice of the medicinal plant *Aloe arborescens*, extracted by a novel method in pure unadulterated beeshoney, useful in the treatment and relief of respiratory diseases, affecting cures of clinical symptoms in acute cases, and achieving considerable improvement in chronic cases. The composition is taken orally by the patient, and with a unit dosage form the treatment is continued until the desired results are achieved. The method of preparation is described in detail.

4 Claims, No Drawings

COMPOSITION FOR TREATING RESPIRATORY DISEASES

This is a continuation-in-part application of the application for the granting of Letters Patent Ser. No. 694,394, filed Dec. 29, 1967, now in the process of being appealed to the United States Court of Customs and Patent Appeals. Application Ser. No. 694,394 itself was a continuation-in-part application of application for Letters Patent, Ser. No. 510,396, filed Nov. 29, 1965, which in itself was a continuation-in-part application of the original application for Letters Patent, Ser. No. 690,450, of the 1950 series filed on Oct. 16, 1957 all of which are now abandoned. Thus the instant application claims the priority dates of Oct. 16, 1957, Nov. 29, 1965, and Dec. 29, 1967.

This invention relates to a composition of matter used as a medicine to be taken internally, which we denominate Almedin. The dose for adults is one tablespoon four times daily, ½ hour each before breakfast, luncheon, and dinner, with the last dose to be administered at bed-time. Children between 5 and 12 years of age take one teaspoon four times daily at the same time as the adult patients, while children between 3 months and 5 years take ½ teaspoon three to four times daily, or according to the advice of the physician. Children above 12 years of age may take the adult dose. The duration of the treatment is about 1 week for acute respiratory diseases, to be adhered to even if all symptoms disappear in 3 or 4 days. In chronic respiratory diseases 1 month or more of treatment with our composition of matter might be necessary, depending upon the degree of severity of the disease. Till the present time, all patients, on whom our composition of matter Almedin has been tested, responded favourably to the treatment without any side- or after-effects.

It is an object of this invention to relieve and improve acute respiratory diseases, such as bronchitis and post-influenzal cough, and to beneficially affect chronic respiratory conditions, such as chronic bronchitis, bronchial-asthma and cigarette cough.

Almedin is a biological medicine in syrup form, with both specific and nonspecific activity. The specific action relates mainly in a purifying effect, by cleaning both, the respiratory passages, and the bronchial tree from mucus and phlegm, and the intestines from the dross of the disease. The nonspecific activity of our composition of matter Almedin is demonstrated by its strengthening and energizing property by which the patient's own resistance and recuperative powers are stimulated. This mode of action is described in the further contents of this Specification.

In proceeding with the invention we use the freshly cut leaves of a special type of Aloe plant, and pure, unadulterated bees-honey. These two ingredients, which are the only ones involved in the composition of matter, and comprise the entire compound, we shall define in detail as follows: As far as the Aloe plant is concerned, we are submitting a detailed definition in order to avoid a possible confusion of terms. Such a confusion might occur due to the fact that the genus *Aloe Liliacae* consists of more than 260 different species, some of which in turn occur in several varieties, and most of the species of the Aloe plants hybridize with each other easily. In addition, almost all of the various species are known by several different names for one and the same plant. Therefore, in the following discussion we first present the classification of our particular Aloe plant within the genus of all Aloes, proceeding according to the Handbook of Succulent Plants by Hermann Jacobsen, member of the International Organization for succulent plant study in Zurich, (in German: *Handbuch der sukkulenten Pflanzen*. Veb Gustav Fischer Verlag, Jena, 1954, pp. 176–192), which is based on the work of A. Berger and G. F. Reynolds in classifying the Aloes.

The entire genus *Aloe Liliacae* has been classified into eleven different sections, according to the type of their leaves. The fourth section of these describes the Eualoes, which is the section of significance for this application.

The Eualoes subdivide into 29 series according to the prevalence of common characteristics, these series are grouped into five subsections, according to the shape and size of the plants as a whole.

The fifth Subsection, lettered E by Berger and Reynolds, describes the *Eualoe Magnae*. This subsection contains series 26 through 29 of the Eualoe section. Series 28 describes the *Eualoe Magnae Arborescentes*, and is typified by the species *Aloe arborescens Miller*. This series encompasses five species of Aloe, three of which are rather bush-like in nature, namely *Aloe bulbillifera*, *Aloe mutabilis*, and *Aloe vanbalenii*. The remaining two species are large, strong, and tree-like, they are *Aloe arborescens Miller* and *Aloe pluridens Haw*.

The Aloe utilized in our composition of matter Almedin is the above-named species.

ALOE ARBORESCENS MILLER also known as: *Aloe arborescens perfoliata*, *Aloe perfoliata var. arborescens SOLAND*, *Aloe arborea MEDIC*, *Aloe fruticosa LAM*, (see p. 197 of the above referred Handbook).

For the definitive description of *Aloe arborescens Miller*, or *Aloe arborescens perfoliata*, we quote the *Standard Cyclopedia of Horticulture* by L. H. Bailey, vol. I, 3rd edition, The MacMillan Co., New York, 1925, p. 260:

"Trunk simple, finally 10 to 15 ft. high, clothed at top with the withering leaves: leaves sinuately spreading, gradually narrowed, dull green, 2 by 24 inches, the repand margin with rather long cartilaginous white prickles; inflorescens elongated; flowers about 1½ inches long, red, with distinct segm. (Cape (?) B.M. 1306."

"Bot. Repos. 468, Berger 115."

Varies into numerous forms:
1. green leaved, with shorter trunk and long leaves, variation *ucriae*, Berger (*Aloe arborescens ucriae*, Terr.) Salm, Aloe Sec. 26, f 3, G.W. 10, p 13. Berger 116, 117;
2. or shorter leaves, var. *viridifolia* (*Aloe arborescens viridifolia*, Berger) - Berger f 117.
3. or glaucuous or blue leaved, with branches inflorescens, variation *natalensis*, Berger, (*Aloe arborescens natalensis*, Wood & Evans) Berger 115;
4. or simple inflorescens with normal flowers, var. *frutescens*, Link (*Aloe arborescens frutescens*, Salm Dyck) Berger 120;
5. or flowers 2 inches long, var. *pachythyrsa*, Berger 118, 119. (*Aloe arborescens pachythyrsa*, Berger).

For the Berger references please see Monograph on Aloes by Alwin Brger, *Das Pflanzenreich*, 1908, Heft 33.

For the purposes of our invention, all six varieties of the species *Aloe arborescens* are of use, but no other species of the *Eualoe Magnae Arborescentes* Subsection, as well as no Aloe species of any other Section, Subsection or Series within the genus.

*Exotica* 3, Pictorial Cyclopedia of Exotic Plants, by Alfred B. Graf (Roehrs Publ. Committee, Rutherford, N.J., January 1963) defines the Aloe species, which is significant for our invention, as follows:

"*Aloe arborescens* (So. Africa), 'Candelabra Aloe', spreading rosette with sword-like, fleshy tapering leaves to 2 ft. long, glaucuous pale bluish-green, edged with yellow horny teeth; on stems reaching 15 ft., flowers red, in dense racemes."

Jacobsen mentions as the home of Aloe arborescens the states of Natal and Cape Province in South Africa.

The second ingredient, honey, is defined by medical dictionaries as a saccharine substance, deposited by the honey bee, which is being used as a food, as an expicient or flavoring agent, and as an application to aphthae. In our invention, however, honey is not used in this conventional way as a mere sweetener of the bitter substance "aloe", but in a novel manner, as put forth below.

The medicinal compound "Almedin", the result of our composition of matter, is formulated as follows:

Method of Preparation

The freshly cut leaves of the plant *Aloe arborescens* are cleaned and carefully wiped dry, as not a drop of water may come into contact with the fresh aloe juice. Experimentation has shown that water immediately activates enzymes and other factors which rapidly decompose the aloe juice. From this same reason all vessels, with which the composition or its ingredients come into contact during the preparation, as well as the bottles into which it will be filled afterward, must be sterilized beforehand and carefully checked to be devoid of water. The leaves are cut into thick slices, which are introduced into the same quantity by weight of pure bees-honey. The mixture is brought to a boil for a period of about 10 minutes, starting when the first bubbles appear. While boiling, the compound is stirred from time to time.

In this manner the honey, heretofore known merely as a sweetener and excipient, is the medium which extracts the juice from the *Aloe arborescens* leaves by means of the heating step, and at the same time activates the expectorant property of the composition. Thus a chemical reaction is taking place, in which the bitter pentosides of the aloe juice and the sweet hexoses of the honey are participating. This combination creates a complete sugar spectrum from sweet to bitter saccharides.

The exact nature of the above described reaction is as yet unknown, due to the difficulty of isolating and identifying every single component of the aloe leaves, especially since the very act of isolating a component might destroy factors dependent upon the interaction of various components at the same time. But the results of this chemical reaction demonstrate themselves in the curative effects of the composition. None of the two ingredients by themselves possess this property.

After boiling, the liquid portion of the mixture is passed through a sieving equipment into a second sterile container. The solid leaves are pressed by the equipment, e.g. by means of a juicer to obtain the remaining part of the juice which is added to the liquid already obtained and mixed well. The preferred storage is in dark sterilized medicine bottles.

Thus processed, the solid rejects amount to approx. 10% of the liquid gained, or approx. 20% of the original weight of the leaves. Thus the percentage by weight of the aloe juice to honey after processing varies from 40% to 48%, and of the honey from 60% to 52%, with the preferred ratio being 44.4% aloe juice to 55.6% honey, or 4 parts of juice to 5 parts of honey, with one part of solid Aloe leaf rejects. A variation of the relative proportions beyond the above interval, either way, results in a rapid diminution of the healing properties of the composition. The liquid, still at some high temperature of above 60°C is poured into sterilized and completely dry bottles, and is allowed to cool. Since Almedin is light sensitive, it should be placed into dark bottles, and stored in a cool place.

Thus treated Almedin will not decay or putrefy for several years, avoiding the need to add chemical or other preservatives.

Distinction from the Prior Art

The above method of processing and obtaining the medicinal compound Almedin from the juice and the suspended particles of fresh and living *Aloe arborescens* leaves extracted in pure bees-honey, distinguishes clearly from the prior art, where either water or alcohol is used for the extraction of the aloe juice from the conventional Aloe plants, rich in Aloin, or where the juice of the leaves is even collected in goats' hides, or in troughs, out in open nature, subject to contamination by flying insects, dust, etc. This is especially the case of Socotrine aloe which, as the result of long drying periods in open nature, contains much foreign matter. (U.S. Dispensatory 25th Edition, 1955, p. 47.) This has been the conventional method for the production of the commercial aloes, which are used solely for laxative purposes. No other utility for Aloe plants has been known till our discovery. Furthermore, never before, in the pharmaceutical literature, has bees-honey been used as an extracting medium. Thereby our method, as described in this Specification, is an improvement in the pharmaceutical art.

Properties of Almedin

The resulting medicine demonstrates several properties, useful in the combatting of respiratory diseases, the most outstanding of which is its expectorant action. Nowhere in the literature is found any evidence of an expectorant factor in aloes (which is the processed juice of various commercial aloe plants).

We further stress the fact that, while conventional commercial aloes are useful in cleansing out the bowel, the *Aloe arborescens* preparation, formulated in the manner described above, has demonstrated its potency in cleansing the bronchial tree, an essential advance in the state of the art, and a new discovery concerning the aloe plants, on which property we in part base our invention.

The second main property of our Composition of Matter, Almedin, is its stimulant and invigorating action.

Modern medical science teaches that nonspecific medicines have a generally rejuvenating effect on the body of the patient, as the result of which his recuperative powers are multiplied, and his natural defenses are reinforced. Almedin has shown to possess these properties.

In addition Almedin restores a healthy metabolic rate. Thus under Almedin therapy the patient does not feel depressed and weakened, as it is the case with antibiotics treatment, as well as with medicines containing narcotics. On the contrary, with Almedin treatment the patient regains his appetite, even a feeling of hunger, already after a few dosages have been administered to him. He loses his fever without the necessity to take some other medication, and regains soon a general feeling of wellbeing.

Another observation has shown that the complete spectrum of both, the bitter pentose as well as the sweet hexose sugars of our Composition of Matter aids in the restoration of a healthy metabolic rate of the patient. The blood sugar level is kept steady.

These new, useful, and unexpected results of the formulation of Almedin we documented by the submission of medical attestations, affidavits, and controlled tests, written by seven physicians, doctors of medicine and osteopathy, describing thirty-two case histories of patients in two states of the Union and in Mexico. We are listing this medical evidence in chronological order, as follows:

1. Attestation of Dr. S. J. P. Turco, M.D., of Peace Dale, R.I., Head of the Infirmary of the University of Rhode Island, dated 1-28-1959, covering two cases of acute bronchitis with fever, cured in 3 days, and 4 days, respectively.
2. Affidavit of Drs. W. E. Tunnell and D. D. Cline, of the Compton Physicians and Surgeons Hospital in Compton, California, dated 1-23-1960, discussing two cases of chronic asthma and chronic bronchitis, complicated by emphysema and pulmonary fibrosis in one of the cases, treated with Almedin, with best results obtained.
3. Attestation of Dr. W. E. Tunnell, M.D., D.O., of Compton, California, as above, dated 10-24-60, covering six cases of acute respiratory problems treated and cured in a surprisingly short time of 2 till 5 days. These cases, as acute bronchitis, post influenzal cough, cigarette cough, and rhinitis, would under convention-al therapy, require about 3 weeks or more of treatment.
4. Affidavit of Drs. W. E. Tunnell and D. D. Cline, of Compton, California, as above, undated, but issued in November 1960, giving their professional opinion on the pharmacodynamics of Almedin, in which they confirm their observations of a "strong expectorant action by stimulating normal secretion by the bronchial ciliated epithelium . . . ", the specific healing action of our composition Almedin.
5. Attestation of Dr. W. E. Tunnell, M.D., D.O., of Compton, California, as above, dated 12-23-1960, reporting further on one of the cases of chronic bronchitis, asthma, and emphysema, mentioned in the prior affidavit of 1-23-60, where the treatment had been resumed after 10 months.
6. Attestation of Dr. Robert Rosen, M.D., of Spring Valley, California, dated 6-7-1968, covering the case histories of 9 patients, in age up to 87 and 94 years, treated with Almedin for influenza and influenzal cough, cigarette cough, and for a general rebuilding and strengthening of the organism of patients suffering from a variety of chronic respiratory and organic diseases, with significant success.
7. Affidavit of Drs. Juan Medrano Padilla, Alfredo Terreros Villegas, and Miguel Solorio Magdaleno, of the Miguel Aleman General Hospital in Tijuana, Mexico, of which Dr. Medrano is the Director, and the other two physicians are on the staff of the Pediatric Ward, dated Mar. 17, 1969, discussing controlled tests with Almedin on two groups of 12 patients each, the clinical histories of the test group being discussed in detail. The observation of importance is that the Almedin treated group had an average hospital stay of 4.2 days as compared with an average stay of 5.9 days for the conventionally treated control group, or an improvement of 40% in favor of Almedin. The youthful patients, in age from 3 months up to 7 years, were treated for respiratory ailments such as grave acute bronchitis, asthma, pneumonia, and tracheitis.
8. Affidavit of Drs. Medrano, Terreros, and Solorio of the Miguel Aleman General Hospital in Tijuana, B.C., as above, dated 8-26-1969, explaining some of the features of the controlled tests reported on earlier, and showing that the results are scientifically valid as well as unique in their medical practice, which makes the data statistically significant.
9. Statement of Dr. Robert Rosen, M.D., of Spring Valley, California, dated 9-25-69, discussing the nonspecific action of Almedin in rebuilding the body's own defenses, which puts this composition into the same class of medicine as gamma globulin, the newly researched medication called caseidin, and synthetic ribonucleic acid, which stimulates the body's interferon mechanism. Caseidin, by destroying all bacterial agents, and Interferon, by neutralizing all harmful viruses, are applicable, due to their nonspecificity, to a myriad of diseases. Almedin is seen to act in an analogous way.
10. Affidavit of Manfred I. L. Seegall and Vera A. Seegall, the inventors, sworn to before a Notary Public on Sept. 16, 1969, describing the specific composition of the medicine made available to the several medical doctors of record for their testing programs, and generally describing the use to which this compound was put by them.

The above ten medical documents, filed with the United States Patent Office over a period of years with our earlier applications, have all been collected and incorporated into the file of Application Ser. No. 694,394.

We courteously request that these ten documents be incorporated into the file of the instant application, according to the rules and statutes of the U.S. Patent Office, as these documents represent our proof of utility of our invention, the Composition of Matter "Almedin". We reserve the right to present further medical evidence on the use and properties of Almedin in the course of these proceedings.

The above documents provide proof for the various properties of Almedin as follows:

1. The expectorant action of Almedin is confirmed in Document 2, 3, 4, and 5, signed by Drs. Tunnell and Cline. Its potency in cleansing the bronchial tree is described in detail in Document 4, an affidavit of Drs. Tunnell and Cline.
2. The stimulant and invigorating action of Almedin is confirmed in Document 6, the attestation by Dr. Robert Rosen, especially in the first four clinical case histories presented therein, and also in Document 2 and 5, signed by Drs. Tunnell and Cline, wherein they state that "the patient . . . volunteered the statement that she feels better than she had for several years." (Document 2, Patient H. N.), and "The patient has more energy now . . . " (Document 5)
3. The specific action of Almedin, in treating respiratory diseases, is confirmed in Documents 1, 2, 3, 4, 5, 6, and 7, which list the 32 case histories presented by us. Of special significance here is Document 7, complemented by Document 8, signed by Drs. Medrano, Terreros, and Solorio, discussing controlled tests on children between 3 months and 7 years of age, six of which were done on children under 1 year of age. The success of Almedin on these patients eliminates the need of animal tests of our composition for patent purposes, since the effect of imagination or suggestion is ruled out here.
4. The non-specific action of Almedin is especially well pointed out in Document 9, as well as in Document 6, both signed by Dr. Robert Rosen. Regarding this special feature of our invention, the statement of Dr. Rosen, dated 9-25-1969, (Document 9) shows that our medicine belongs to a group of medications building up the bodily resistance itself, so that numerous diseases are successfully treated with one and the same medication. In addition, modern medical research now aims in this very same direction as our medicine.

In this connection, may we respectfully point out that our medicinal compound Almedin anticipated the modern trend in medical research of overcoming disease by building up the body's defense mechanisms, results of which are now being published, by more than 10 years. In the first paper of our original application, filed October 16, 1957, Ser. No. 690,450, for Composition of Matter, we made the following statement (see page 5 bottom and page 6 top of the printed record for the U.S. Court of Customs and Patent Appeals which is in the files of the U.S. Patent Office):

"The medicine supplies the body with powerful substances, which beside healing locally, restores the efficiency of the body's metabolic mechanism. It does not act just by local stimulating processes which until recently was a basis of today's medical science (antibiotic and sulfa drug treatment were the first noticeable exceptions), but by the strengthening of the general organism and the build-up of its own resistance and recuperative powers. One of the immediate results is the restoring of appetite even in cases of feverish illnesses, which appears immediately after the first dosages. A secondary, but very important effect on the sick body is the restoration of a healthy metabolic rate, Constipation accompanying almost every serious disease disappears and elimination of unhealthy substances, impurities and germs occurs."

It is only because of the various delays and rejections at the U.S. Patent Office that we did not introduce the medicinal compound Almedin to the market to be officially recognized as the leader in this trend, modern medicine is now beginning to follow.

In order to complete the enumeration of the properties of our Composition of Matter "Almedin" we point out that beside the expectorant, stimulant and invigorating properties, this medicine is also of assistance in regulating the bowel movement, which is an important factor in the treatment of any ailment. In this connection the chemical analysis of Aloe arborescens perfoliata, the main ingredient of our medicinal compound Almedin, is of importance, since if shows that this species does not contain any ALOIN, the laxative principle present in most of the other species of the genus Aloe.

Therefore, Almedin is not a purgative. (We refer to the table on page 105 of the U.S. Dispensatory 21 Edition 1926, taken from the paper of Bainbridge and Morrow, P.J., Jan., 1890.) Thus it is obvious that the cleansing of the bowel is due to the effect of Almedin upon the metabolic system of the patient which appears also in the restoration of the appetite, as well as by the tonic action of this medicine, which shortens considerably the course of the disease and the time of the convalescense.

To obtain all these beneficial effects in just one simple and harmless medicine, consisting of two ingredients only, is a unique achievment in the history of medicine, and a great improvement in the pharmaceutical art.

We claim as the subject of our invention:
1. A composition exhibiting an expectorant property, with the ability to cleanse the bronchial tree, and a tonic property by strengthening and energizing, and a generally stimulant property, with a favorable effect on metabolism, all of which makes it useful in the treatment of acute and chronic bronchitis, post-influenzal cough and cigarette cough, said composition consisting of 44.4% by weight of the juice from freshly cut leaves of the plant *Aloe arborescens*, including suspended solid ingredients of this plant, obtained by extracting the leaves in boiling bees-honey, in quantity of 55.6% by weight.
2. A process of preparation of the composition claimed in claim 1, the entire process consisting of the following steps of:
  1. combining clean, dry, fresh, sliced leaves of the living Aloe arborescens plant with an equal amount by weight of pure, unadulterated bees-honey;
  2. bringing the combination to a boil for about ten minutes;
  3. after boiling, the mixture is passed through a sieving apparatus, and the solid remnants of the leaves are pressed in order to obtain the remaining part of the juice, which is added to the liquid already obtained, and the resulting composition is bottled, while during the entire procedure the addition of water, alcohol, or any other substance has to be avoided, the resultant composition consisting of 44.4% by weight of the aloe juice and 55.6% by weight of bees honey.
3. A process for preparing a composition useful for treating acute and chronic broncitis, post-influenzal cough and cigarette cough, consisting of the following steps:
  1. preparation of the freshly cut leaves of the plant Aloe arborescens by cleaning them, and wiping them dry, as not one drop of water may come into contact with the fresh aloe juice;
  2. cutting the leaves into thick slices and introducing them into the same quantity by weight of pure bees-honey;
  3. bringing the mixture to a boil and continuing the boiling for a period of about 10 minutes, stirring said mixture occasionally;
  4. after boiling passing the liquid portion of the mixture through a sieving apparatus, and pressing the solid remnants by means of a juicer in order to obtain the remaining part of the juice, which is added to the liquid already obtained, which is stirred and bottled, the remaining solids being rejected;
  5. while during the entire procedure the addition of water, alcohol, or any other substance has to be avoided, the resultant composition consisting of

40% to 48% by weight of the juice and suspended solids of *Aloe arborescens* and 60% to 52% by weight of pure bees honey.

4. The composition prepared by the process of claim 3.

* * * * *